(12) United States Patent
Kabalnov et al.

(10) Patent No.: US 12,115,723 B2
(45) Date of Patent: Oct. 15, 2024

(54) THREE-DIMENSIONAL PRINTING

(71) Applicant: Hewlett-Packard Development Company, L.P., Spring, TX (US)

(72) Inventors: Alexey S. Kabalnov, San Diego, CA (US); Jacob Wright, San Diego, CA (US); Behrang Khorsandian, San Diego, CA (US); Bernardo A. Gutierrez, San Diego, CA (US); Geoffrey Schmid, San Diego, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 195 days.

(21) Appl. No.: 17/288,522

(22) PCT Filed: Jun. 10, 2019

(86) PCT No.: PCT/US2019/036325
§ 371 (c)(1),
(2) Date: Apr. 24, 2021

(87) PCT Pub. No.: WO2020/251532
PCT Pub. Date: Dec. 17, 2020

(65) Prior Publication Data
US 2022/0088856 A1    Mar. 24, 2022

(51) Int. Cl.
*B29C 64/165* (2017.01)
*B33Y 10/00* (2015.01)
(Continued)

(52) U.S. Cl.
CPC .... *B29C 64/165* (2017.08); *B29K 2995/0035* (2013.01); *B33Y 10/00* (2014.12);
(Continued)

(58) Field of Classification Search
CPC .......... B29C 64/165; B29K 2995/0035; B33Y 10/00; B33Y 70/00; B82Y 20/00; B82Y 30/00
See application file for complete search history.

(56) References Cited

U.S. PATENT DOCUMENTS

| 7,821,675 B2 | 10/2010 | Coyle et al. |
| 8,087,768 B2 | 1/2012 | Daems et al. |

(Continued)

FOREIGN PATENT DOCUMENTS

| CN | 106393671 A | 2/2017 |
| EP | 1281738 A1 | 2/2003 |

(Continued)

OTHER PUBLICATIONS

"Benzoxazole." National Center for Biotechnology Information. PubChem Compound Database, U.S. National Library of Medicine, pubchem.ncbi.nlm.nih.gov/compound/benzoxazole#section=Experimental-Properties. Accessed Dec. 22, 2023. (Year: 2023).*

*Primary Examiner* — Jennifer A Smith
*Assistant Examiner* — Jeffrey Eugene Barzach
(74) *Attorney, Agent, or Firm* — HP Inc. Patent Department

(57) ABSTRACT

A multi-fluid kit for three-dimensional printing includes a fusing agent and a fluorescing detailing agent. The fusing agent includes water and a radiation absorber. The radiation absorber absorbs radiation energy and converts the radiation energy to heat. The fluorescing detailing agent includes water and a fluorescent colorant that is active by exposure to ultraviolet energy to emit light in the visible range of from about 400 nm to about 780 nm. The multi-fluid kit is devoid of a second detailing agent and a second fluorescent colorant.

13 Claims, 3 Drawing Sheets

(51) Int. Cl.
  *B33Y 70/00* (2020.01)
  *B82Y 20/00* (2011.01)
  *B82Y 30/00* (2011.01)

(52) U.S. Cl.
  CPC .............. *B33Y 70/00* (2014.12); *B82Y 20/00* (2013.01); *B82Y 30/00* (2013.01)

(56) References Cited

U.S. PATENT DOCUMENTS

| | | |
|---|---|---|
| 10,029,483 B2 | 7/2018 | Kobayashi et al. |
| 2008/0073617 A1 * | 3/2008 | Cockcroft .............. D21H 21/30 252/301.21 |
| 2008/0149894 A1 | 6/2008 | Auslander et al. |
| 2013/0216947 A1 | 8/2013 | Susuki et al. |
| 2019/0389139 A1 * | 12/2019 | Wu ........................ C08L 71/02 |

FOREIGN PATENT DOCUMENTS

| | | | |
|---|---|---|---|
| JP | 2018127740 A | 8/2018 | |
| KR | 20190036906 A | 4/2019 | |
| WO | WO-2007048720 A1 * | 5/2007 | ............. D21H 21/30 |
| WO | WO-2017188961 A1 * | 11/2017 | ........... B29C 64/112 |
| WO | WO-2017188963 A1 * | 11/2017 | ........... B29C 64/165 |
| WO | WO-2017188965 A1 * | 11/2017 | ........... B29C 64/165 |
| WO | WO-2017189306 A1 * | 11/2017 | ........... B29C 64/165 |
| WO | WO-2018147186 A1 | 8/2018 | |

\* cited by examiner

THREE-DIMENSIONAL PRINTING

BACKGROUND

Three-dimensional (3D) printing may be an additive printing process used to make three-dimensional solid parts from a digital model. 3D printing is often used in rapid product prototyping, mold generation, and mold master generation. Some 3D printing techniques are considered additive processes because they involve the application of successive layers of material. This is unlike traditional machining processes, which often rely upon the removal of material to create the final part. Materials used in 3D printing often include curing or fusing, which for some materials may be accomplished using heat-assisted extrusion or sintering, and for other materials may be accomplished using digital light projection technology.

DETAILED DESCRIPTION

Figure 1:
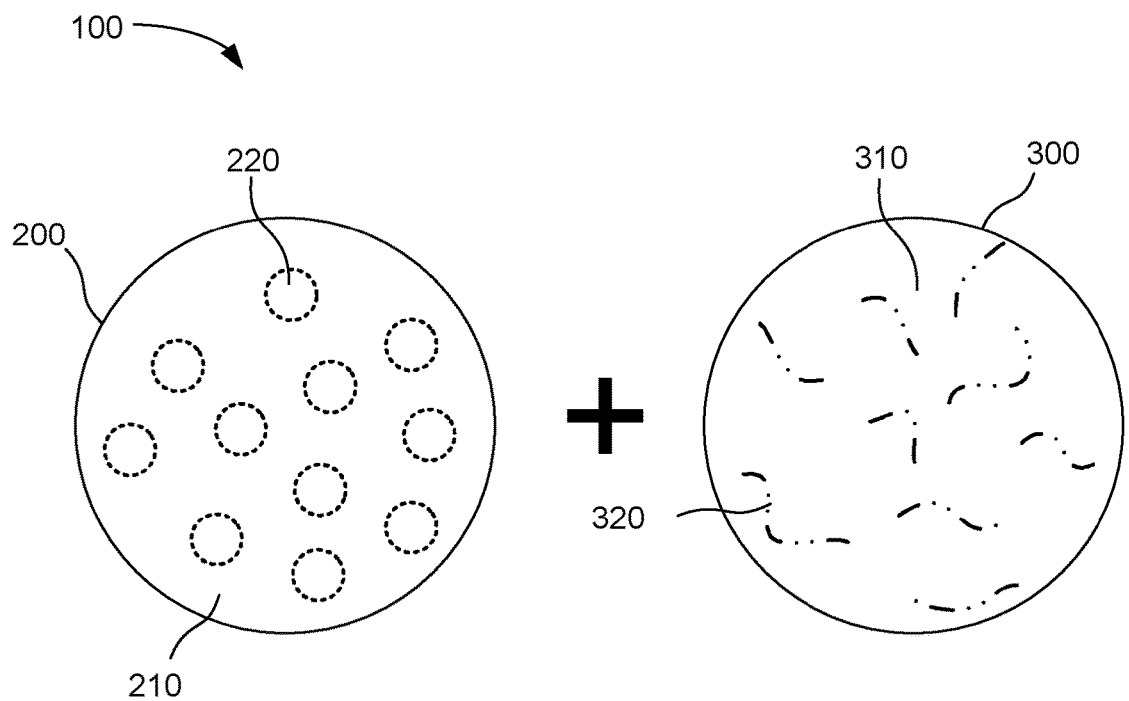
FIG. 1 graphically illustrates a schematic view of an multi-fluid kit for three-dimensional printing in accordance with examples of the present disclosure.

An example three-dimensional (3D) printing process can be an additive process that can involve the application of successive layers of build material with chemical binders or adhesives printed thereon to bind the successive layers of build materials together. In some processes, thermal fusing, melting, sintering, or the like can be utilized to form a green body object and then a sintered metal three-dimensional physical object. More specifically, a binder fluid can be selectively applied to a layer of particulate build material on a build platform to pattern a selected region of the layer and then another layer of the particulate build material is applied thereon. The binder fluid can be applied to another layer of the particulate build material and these processes can be repeated to form a green body object (also referred to as a green part) of the 3D printed object that is ultimately formed. The binder fluid can be capable of penetrating the layer of the particulate build material onto which the binder fluid is applied, and/or spreading around an exterior surface of the particulate build material and filling void spaces between particles of the particulate build material. The binder fluid can include a binder that can hold the particulate build material of the green body object together. The green body object can be moved to a sintering oven, or another sintering source and exposed to heat to sinter the particulate build material of the green body object together and form the 3D printed object. The present disclosure refers herein to multi-fluid kits for 3D printing, 3D printing kits, and methods of 3D printing.

In one example, a multi-fluid kit for three-dimensional printing can include a fusing agent and a fluorescing detailing agent. The fusing agent include water and a radiation absorber. The radiation absorber can absorb radiation energy and can convert the radiation energy to heat. The fluorescing detailing agent can include water and a fluorescent colorant. The fluorescent colorant can be activated by exposure to ultraviolet energy and can emit light in the visible range of from about 400 nm to about 780 nm. The multi-fluid kit can be devoid of a second detailing agent and a second fluorescent colorant. In on example, the fluorescent colorant can be present in the fluorescing detailing agent at from about 0.01 wt % to about 10 wt %. In another example, the fluorescent colorant can include distrylbenzene, distyrylbiphenyl, divinylstilbene, triazinylaminostilbene, stilbenyl-2H-triazole, benzoxazole, furan, benzofuran, benzimidazole, 1,3-diphenyl-2-pirazoline, coumarin, naphthalimide, europium (III) complex, europium-beta-diketonate, fluorescein, rhodamine, or a mixture thereof. In yet another example, the fluorescent colorant can be colorless unless exposed to the ultraviolet energy. In a further example, the fluorescent colorant can be activated by ultraviolet energy in the range of from about 200 nm to about 400 nm. In one example, the radiation absorber can include an infrared light absorbing nanoparticle or a near infrared light absorbing nanoparticle that can have an average size from about 0.01 nm to about 500 nm. In another example, the radiation absorber can include an infrared light absorbing compound or a near infrared light absorbing compound including carbon black, metal dithiolene complex, metal nanoparticles, oxonol, squarylium, chalcogenopyrylarylidene, bis(chalcogenopyrylo)polymethine, bis(aminoaryl)polymethine, merocyanine, trinuclear cyanine, indene-crosslinked polymethine, oxyindolidine, iron complexes, quinoids, nickel-dithiolene complex, cyanine dyes, conjugated polymer, and combinations thereof. In yet another example, the fusing agent can include from about 60 wt % to about 94 wt % water, from about 5 wt % to about 35 wt % organic co-solvent, and from about 1 wt % to about 20 wt % radiation absorber, based on a total weight of the fusing agent. In one example, the organic co-solvent can include 1-(2-hydroxyethyl)-2-pyrollidinone, 2-pyrrolidinone, 2-methyl-1,3-propanediol, 1,5-pentanediol, triethylene glycol, tetraethylene glycol, 1,6-hexanediol, tripropylene glycol methyl ether, ethoxylated glycerol-1 (LEG-1), or a combination thereof.

In another example, a three-dimensional printing kit can include a polymeric powder build material and a multi-fluid kit. The multi-fluid kit can include a fusing agent and a fluorescing detailing agent. The fusing agent can include water and a radiation absorber. The radiation absorber can absorb radiation energy and can convert the radiation energy to heat. The fluorescing detailing agent can include water and a fluorescent colorant. The fluorescent colorant can be activated by exposure to ultraviolet energy and can emit light in the visible range of from about 400 nm to about 780 nm. In one example, the polymeric powder build material can include from about 80 wt % to 100 wt % polymeric powder, from about 80 wt % to 100 wt % polymer-ceramic powder, from about 80 wt % to 100 wt % or a combination thereof. In another example, the fluorescent colorant can include hexasodium-2,2'-[vinylenebis[3-sulfonato-4,1-phenylene)imino[6-(diethylamino)-1,3,5-triazine-4,2-diyl] imino]]bis(benzene-1,4-disulphonate), triazine-stilbene, or a combination thereof. In yet another example, the radiation absorber can include an infrared light absorbing compound, a near infrared light absorbing compound, infrared light absorbing nanoparticles, near infrared light absorbing nanoparticles, or a combination thereof.

A method for three-dimensional printing can include iteratively applying individual build material layers of a polymeric powder build material, and based on a three-dimensional object model, selectively jetting a fusing agent onto individual build material layers, where the fusing agent includes water and a radiation absorber. The method can further include, based on the three-dimensional object model, selectively jetting a fluorescing detailing agent onto individual build material layers laterally at a border between a first area where the powder bed material is contacted by the fusing agent and a second area where the powder bed material is not contacted by the fusing agent, where the fluorescing detailing agent includes a fluorescent colorant that is active by exposure to ultraviolet energy to emit light in the visible range of from about 400 nm to about 780 nm. The method can still further include exposing the powder bed to energy to selectively fuse the polymer particles in contact with the radiation absorber to form a fused polymer matrix at individual build material layers. In one example, the method can include observing fluorescence of the fluorescent colorant activated by ultraviolet energy in the range of from about 200 nm to about 400 nm after forming the fused polymer matrix.

It is noted that when discussing the fusing agent for a multi-fluid kit for three-dimensional printing, a three-dimensional printing kit, and a method for three-dimensional printing herein, such discussions can be considered applicable to one another whether or not they are explicitly discussed in the context of that example. Thus, for example, when discussing a fluorescent colorant in the context of the fusing agent for the multi-fluid kit for three-dimensional printing, such disclosure is also relevant to and directly supported in the context of the three-dimensional printing kit and/or the method for three-dimensional printing, and vice versa.

It is also understood that terms used herein will have the ordinary meaning in the relevant technical field unless specified otherwise. In some instances, there are terms defined more specifically throughout the specification or included at the end of the present specification, and thus, these terms have a meaning consistent with these more specific definitions.

Multi-Fluid Kits for Three-Dimensional Printing

In one example, a multi-fluid kit 100 for three-dimensional printing is shown by way of example in FIG. 1. The multi-fluid kit can include a fusing agent 200 and a fluorescing detailing agent 300. The fusing agent can include water, such as may be present in a fusing agent liquid vehicle 210, and a radiation absorber 220. The radiation absorber can absorb radiation energy and can convert the radiation energy to heat. The fluorescing detailing agent can include water, which as may be present in a detailing agent liquid vehicle 310, and a fluorescent colorant 320. The fluorescent colorant can be activated by exposure to ultraviolet energy and can emit light in the visible range of from about 400 nm to about 780 nm. The multi-fluid kit can be devoid of a second detailing agent and a second fluorescent colorant.

Three-Dimensional Printing Kit

Figure 2:
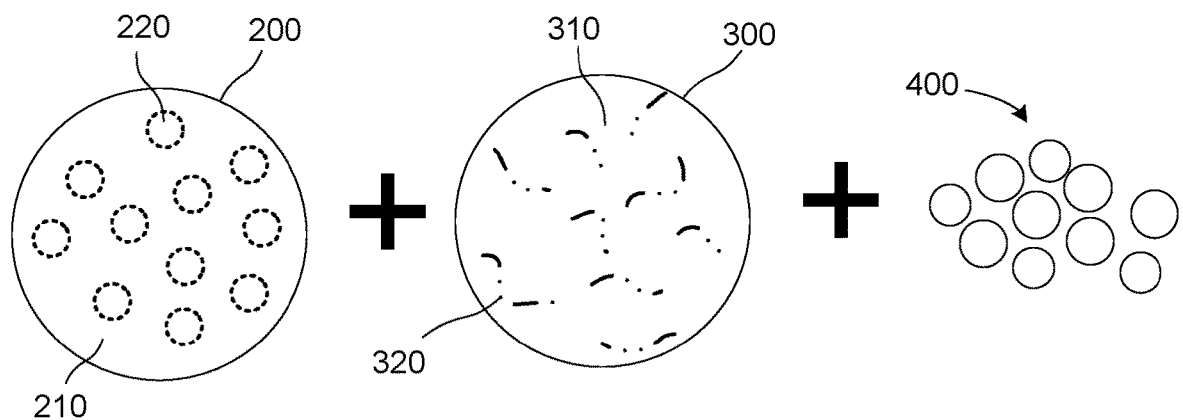
FIG. 2 graphically illustrates a schematic view of an example three-dimensional printing kit in accordance with examples of the present disclosure.

A three-dimensional printing kit 400 is also shown in FIG. 2. The three-dimensional printing kit can include a polymeric powder build material 400 and the multi-fluid kit (shown at 100 in FIG. 1). The multi-fluid kit can include a fusing agent 200 and a fluorescing detailing agent 300. The fusing agent can include water 210 and a radiation absorber 220. The radiation absorber can absorb radiation energy and can convert the radiation energy to heat. The fluorescing detailing agent can include water 310 and a fluorescent colorant 320. The fluorescent colorant can be activated by exposure to ultraviolet energy to emit light in the visible range of from about 400 nm to about 780 nm. The multi-fluid kit can be as described above.

Fusing Agent

In some examples, a fusing agent can include a radiation absorber and water. In yet other examples, a fusing agent can include a radiation absorber and an aqueous liquid vehicle. During three-dimensional printing the fusing agent can be capable of penetrating a layer of a powder build material and spreading onto the exterior surface of the powder build material. This radiation absorber in the fusing agent, can be capable of absorbing radiation and converting the absorbed radiation to thermal energy, which in turn melts or sinters the powder build material that is in contact with the fusing agent. The melting or sintering causes individual particles of the powder build material to fuse, bind, cure, etc. together to form the layer of the 3D green part (or 3D green body object). The fusing agent used in multi-jet fusion tend to have significant absorption (e.g., 80%) in the visible region (400 nm-780 nm). In some examples, the radiation absorber can include an infrared light absorbing nanoparticle, a near infrared light absorbing nanoparticle, an infrared light absorbing compound, a near infrared light absorbing compound, or a combination thereof.

In one example, the radiation absorber can be an infrared light absorbing nanoparticle or a near infrared light absorbing nanoparticle. In some examples, the infrared light absorbing nanoparticle, or a near infrared light absorbing nanoparticle can have a diameter ranging from about 0.1 nm to about 500 nm, or from about 0.5 nm to about 400 nm, or from about 0.6 nm to about 300 nm, or from about 0.7 nm to about 250 nm, or from about 0.8 nm to about 200 nm, or from about 0.9 nm to about 150 nm, or from about 1 nm to about 100 nm, or from about 1 nm to about 90 nm, or from about 1 nm to about 80 nm, or from about 1 nm to about 70 nm, or from about 1 nm to about 60 nm, or from about 2 nm to about 50 nm, or from about 3 nm to about 40 nm, or from about 4 nm to about 40 nm.

In an example, a near infrared or an infrared light absorbing nanoparticle can include a metal oxide, which can absorb infrared light in a range of from about 780 nm to about 2300 nm. In yet other examples the metal oxide can absorb infrared light in a range of from about 790 nm to about 1800 nm, or from about 800 nm to about 1500 nm, or from about 810 nm to about 1200 nm, or from about 820 nm to about 1100 nm, or from about 830 nm to about 1000 nm.

The metal oxide can have the chemical formula shown in Formula (1) below.

$$M_xM'O_n \qquad (1)$$

where M can be an alkali metal, x can be greater than 0 and less than 1, M' can be a transition metal, and n can be greater than 0 and less than or equal to 4. In some examples, M in Formula (1) can be an alkali metal, such as lithium (Li), sodium (Na), potassium (K), rubidium (Rb), cesium (Cs), or mixtures thereof. In one example, M can be cesium (Cs). In some examples, x can range from 0.2 to 0.8. In one example x can be 0.33. In an example, M' can be selected from tungsten (W), molybdenum (Mb), tantalum (Ta), hafnium (Hf), cerium (Ce), lanthanum (La), or mixtures thereof. In one example, M' can be tungsten (W). In some examples, n in Formula (1) above can be greater than 0 and less than or equal to 3.

In one example, the metal oxide nanoparticles can be cesium tungsten nanoparticles and can have the Formula (1) $M_xM'O_n$, wherein M is cesium (Cs), x is 0.33, M' is tungsten (W), and n is greater than 0 and less than or equal to 3. For example, the metal oxide nanoparticle can be a cesium tungsten oxide nanoparticles having a general formula of $Cs_xWO_y$, where $0<x<1$, where y is between 2 and 3. In one example y can be 2.86. The cesium tungsten oxide nanoparticles can provide a light blue color to the fusing agent. The strength of the color may depend in part, on the amount of the cesium tungsten oxide nanoparticles in the fusing agent.

In another example, the metal oxide nanoparticles can be tungsten bronze nanoparticles having the formula $MmWO_3$, wherein M is lithium (Li), sodium (Na), potassium (K), rubidium (Rb), cesium (Cs), or mixtures thereof, M' is tungsten (W), and n is 3.

The metal oxide particles can have a diameter that can range from about 0.01 nm to about 400 nm. In yet other examples, the metal oxide particles can have a diameter that can range from about 0.1 nm to about 350 nm, from about 0.5 nm to about 300 nm, from about 0.7 nm to about 250 nm, from about 0.8 nm to about 200 nm, from about 0.9 nm to about 150 nm, from about 1 nm to about 100 nm, from about 1 nm to about 90 nm, from about 1 nm to about 80 nm, from about 1 nm to about 70 nm, from about 1 nm to about 60 nm, from about 2 nm to about 50 nm, from about 3 nm to about 40 nm, from about 3 nm to about 30 nm, from about 3 to about 20 nm, or from about 3 to about 10 nm.

In another example, the average particle size (e.g., volume-weighted mean diameter) of the metal oxide particles can range from about 1 nm to about 40 nm. In some examples, the average particle size of the metal oxide particles can range from about 1 nm to about 15 nm or from about 1 nm to about 10 nm. When admixed with the liquid vehicle, the liquid vehicle and the metal oxide particles can form a dispersion.

In some examples, fusing agents incorporating metal oxide particles can further include a zwitterionic stabilizer. Zwitterionic stabilizers may contribute the stabilization of the dispersion. While the zwitterionic stabilizer has an overall neutral charge, an area of the zwitterionic stabilizer can have a positive charge (e.g., amino groups) and another area of the zwitterionic stabilizer can have a negative charge. The metal oxide nanoparticles may have a slight negative charge. The zwitterionic stabilizer molecules may orient around the slightly negative metal oxide nanoparticles with the positive area of the zwitterionic stabilizer molecules closest to the metal oxide nanoparticles and the negative area of the zwitterionic stabilizer molecules furthest away from the metal oxide nanoparticles. The negative charge of the negative area of the zwitterionic stabilizer molecules may repel metal oxide nanoparticles from one another. The zwitterionic stabilizer molecules may form a protective layer around the metal oxide nanoparticles, and prevent the metal oxide nanoparticles from coming into direct contact with one another and/or increase the distance between the particle surfaces (e.g., by a distance ranging from about 1 nm to about 2 nm). Thus, a zwitterionic stabilizer may prevent metal oxide nanoparticles from agglomerating and/or settling in the dispersion. In some examples, zwitterionic stabilizers can include $C_2$ to $C_8$ betaines, $C_2$ to $C_8$ amino-carboxylic acids having a solubility of from about 10 g or more in 100 g of water, taurine, and combinations thereof. In one example, the zwitteronic stabilizer can be a $C_2$ to $C_8$ amino-carboxylic acids and can be selected from beta-alanine, gamma-aminobutyric acid, glycine, and combinations thereof.

The zwitterionic stabilizer may be present in an amount ranging from about 2 wt % to about 35 wt % (based on the total wt % of the fusing agent). When the zwitterionic stabilizer is a $C_2$ to $C_8$ betaine, the $C_2$ to $C_8$ betaine may be present in an amount ranging from about 4 wt % to about 35 wt % of a total wt % of the fusing agent. When the zwitterionic stabilizer is a $C_2$ to $C_8$ amino-carboxylic acid, the $C_2$ to $C_8$ amino-carboxylic acid may be present in an amount ranging from about 2 wt % to about 20 wt % of a total wt % of the fusing agent. When the zwitterionic stabilizer is taurine, taurine may be present in an amount ranging from about 2 wt % to about 35 wt % of a total wt % of the fusing agent. The zwitterionic stabilizer may be added to the metal oxide nanoparticles and water before, during, or after milling of the nanoparticles in the water to form the dispersion that would be part of the fusing agent.

In yet other examples, the radiation absorber can include an infrared light absorbing compound or a near infrared light absorbing compound. The compound can be selected from carbon black, metal dithiolene complex, metal nanoparticles, oxonol, squarylium, chalcogenopyrylarylidene, bis(chalcogenopyrylo)polymethine, bis(aminoaryl)polymethine, merocyanine, trinuclear cyanine, indene-crosslinked polymethine, oxyindolidine, iron complexes, quinoids, nickel-dithiolene complex, cyanine dyes, conjugated polymer, or a combination thereof.

In one example, the infrared light absorbing compound or near infrared absorbing compound can be carbon black. The carbon black can be a carbon black pigment. The carbon black pigment can be formulated in a dispersion. Commercially available carbon black dispersion examples can include Cab-o-jet® 200, 300, 400 and the like from Cabot Corporation (USA). In some examples, carbon black can be milled in the presence of polymeric binders and can be converted into a carbon black dispersion. In another example, the carbon black pigment can be in the form of a commercially available ink including from 1 wt % to 10 wt % carbon black. Commercially available carbon black pigment based inks included in print heads can include, for example CM997A, 5206458, C18928, C93848, C93808, or the like, all of which are available from HP Inc.

In another example, the infrared light absorbing compound or the near infrared absorbing compound can be a cyanine dye. The cyanine dye can be selected from carbocyanine, azacarbocyanine, hemicyanine, styryl, diazacarbocyanine, triazacarbocyanine, diazahemicyanine, polymethinecyanine, azapolymethinecyanine, holopolar, indocyanine, diazahemicyanine dyes, or a combination thereof.

In some examples, the radiation absorber can be present in the fusing agent in an amount that can range from about 1 wt % to about 20 wt % based on the total weight of the fusing agent. In yet other examples, the radiation absorber can be present in the fusing agent in an amount that can range from about 5 wt % to about 20 wt %, from about 8 wt % to about 20 wt %, from about 10 wt % than about 15 wt %, or from about 3 wt % to about 10 wt %.

In one example, the fusing agent can include about 60 wt % to about 94 wt % water, from about 5 wt % to about 35 wt % organic co-solvent, and from about 1 wt % to about 20 wt % radiation absorber, based on a total weight of the fusing agent.

Fluorescing Detailing Agent

The multi-fluid kit for three-dimensional printing can include a fluorescing detailing agent. A fluorescing detailing agent can include water and a fluorescent colorant. In another example, a fluorescing detailing agent can include an aqueous liquid vehicle and a fluorescent colorant. The fluorescent colorant can be activated by exposure to ultraviolet energy to emit light in the visible range of from about 400 nm to about 780 nm.

As used herein, "fluorescent colorant," can be defined as a compound that can fluoresce or phosphor. "Phosphor" can refer to inorganic photo-luminescent materials (fluorescent or phosphorescent) that can be in one example, be in the form of a small crystalline particle/powder before mixing admixing with the water/liquid vehicle. The use of "phosphor" can be generalized to encompass all particle-based photo-luminescent materials, which can include quantum dots, other spectrum-converting nanoparticles and conjugates, and other fluorescent or phosphorescent materials other than organic fluorescent dye or phosphorescent dye. "Fluorescent or phosphorescent dye," as used herein, refers to fluorescent or phosphorescent materials distributed at a molecular level in solutions (e.g., polymers, sol gels, low temperature glasses, liquids or gels, and other translucent materials in a wide variety of shapes). Dyes include organic dyes that are dissolved in polymers or other media and then formed into particles, even though they may be used for similar purposes as phosphors or QDs.

In some examples, the fluorescent colorant can dissolve in the water/liquid vehicle. In yet other examples, the fluorescent colorant can be a dispersion when admixed with the water/liquid vehicle.

In some examples, the fluorescent colorant can be colorless unless exposed to the ultraviolet energy. The fluorescent colorant can be invisible to the naked eye in the visible light spectrum without exposure to ultraviolet energy. The fluorescent color agent can be excited by ultraviolet energy, e.g., about 200 nm to about 400 nm, about 300 nm to about 400 nm, or about 350 nm to about 400 nm. Following excitation by ultraviolet light, fluorescent colorant can emit light in the visible range, e.g., about 400 nm to about 780 nm, which can be for example, blue, red, or green in color.

In some examples, the fluorescent colorant can be selected from distyrylbenzene, distyrylbiphenyl, divinylstilbene, triazinylaminostilbene, stilbenyl-2H-triazole, benzoxazole, furan, benzo[b]furan, benzimidazole, 1,3-diphenyl-2-pirazoline, coumarin, naphthalimide, organic europium (III) complex, fluorescein, rhodamine, or mixtures thereof. In one example, the fluorescent colorant can be a rhodamine. In another example, the fluorescent colorant can be hexasodium-2,2'-[vinylenebis[3-sulfonato-4,1-phenylene)imino[6-(diethylamino)-1,3,5-triazine4,2-diyl]imino]]bis(benzene-1,4-disulphonate). In yet another example, the fluorescent colorant can be selected from TINOPAL® SFP, TINOPAL® CBS SP, TINOPAL® CBS-CL, TINOPAL® CBS-X, TINOPAL® DMA-X, TINOPAL® NFWLIQ, or combinations thereof—all available from BASF Corp (Germany).

In further examples, the fluorescent colorant can include an optical brighteners. Optical brighteners can include compounds with fluorescence or phosphorescence between 370 nm and 1100 nm and can include for example, UVITEX® OB, UVITEX® OB-C, UVITEX® OB-P, UVITEX® NFW, UVITEX® FP, UVITEX® FP-C, TINOPAL® SFP, TINOPAL® MSP, or combinations thereof, all of which are commercially available from BASF Corp (Germany).

Other examples of optical brighteners can include stilbene derivatives such as 4,4'-bis(triazin-2-ylamino)stilbene-2,2'-disulfonic acid derivative where the triazinyl groups are substituted with a substituent selected from anilino, sulfanilic acid, metanilic acid, methylamino, N-methyl-N-hydroxyethylamino, bis (hydroxyethylamino), morpholino, diethylamino; mono(azol-2-yl)stilbenes such as 2-(stilben-4-yl)naphthotriazoles and 2-(4-phenylstilber-4-yl)benzoxazoles; bis(azol-2-yl)stilbenes such as 4,4'-bis(triazol-2-yl)stilbene-2,2'-disulfonic acids; styryl derivatives of benzene and biphenyl such as 1,4-bis(styryl)benzene and 4,4' bis (styryl)biphenyl; pyrazoline such as 1,3-diphenyl-2-pyrazoline; bis(benzazol-2-yl) derivatives having as phenyl ring substituents alkyl, COO-alkyl, and SO.sub.2-alkyl; bis(benzoxazol-2-yl) derivatives; bis(benzimidazol-2-yl) derivatives such as 2-(benzofuran-2-yl)benzimidazole; coumarins such as 7-hydroxy and 7-(substituted amino) coumarin, 4-methyl-7-amino-coumarin derivatives, esculetin, beta-methylumbelliferone, 3-phenyl-7-(triazin-2-ylamino)coumarins, 3-phenyl-7-aminocoumarin, 3-phenyl-7-(azol-2-yl) coumarins, and 3,7-bis(azolyl)coumarins; carbostyrils, naphthalimides, alkoxynaphthalimides, derivatives of dibenzothiophene-5,5-dioxide, pyrene derivatives, and pyridotriazoles.

In some examples, the fluorescent colorant can include an organic metal complexe. Example organic metal complexes can be derived from europium, zinc, iridium, aluminum, gallium and terbium. Examples of such materials can include: tris(benzoylacetonato)mono(phenanthroline)europium (III), tris(dibenzoylmethane)mono(phenanthroline)europium (III), tris(dibenzoylmethane)mono(5-aminophenanthroline)europium (III), tris(dinaphthoylmethane)mono(phenanthroline)europium (III), tris (dibiphenoylmethane)mono(phenanthroline)europium (III), tris(dibenzoylmethane)mono(4,7-dimethylphenanthroline) europium (III), tris(dibenzoylmethane)mono(4,7-diphenylphenanthroline)europium (III), bis(8-hydroxyquinolato) zinc bis(2-methyl-8-hydroxyquinolato)zinc, iridium (III) tris (2-phenylpyridinato-N,C.sup.2')picolate, Iridium (III) tris(2-(4-tolyl)pyridinato-N,C.sup.2')picolinate, iridium (III) bis (2-(4,6-difluorophenyl)pyridinato-N,C.sup.2'), iridium (III) bis(2-(2'-benzothienyl)pyridinato-N,C.sup.3')(acetylacetonate), tris(8-hydroxyquinolato)aluminum (III), tris(2-methyl-8-hydroxyquinolato)aluminum (III), tris(8-hydroxyquinolato)gallium (III), tris(2-methyl-8-hydroxyquinolato) gallium (III), tris(3-methyl-1-phenyl-4-trimethyl-acetyl-5-pyrazoline)terbium (III), or mixtures thereof.

In further examples the fluorescent colorant can include a fluorescent brightener containing sulfo groups, such as stilbene fluorescent brighteners including bis-triazinylaminostilbenedisulfonic acid, bis-styrylbiphenyl, bis-styrylbenzene, and the bis-triazolylstilbenedisulfonic acid. A fluorescent colorant containing sulfonic acid groups can be in the form of a metal salt, such as, lithium, potassium, magnesium or sodium salts, and also ammonium, amine or alkanolamine salts or can be in the form of a free acid.

Yet other examples of fluorescent colorants can include dyes. The dye can include fluorescent naphthalimide dyes for example, Morton Fluorescent Yellow G (Color Index 75), Fluorol 7GA (Color Index-Fluorescent brightening agent 75), Calcofluor Yellow (Color Index-Fluorescent brightening agent No. 4) and Azosol Brilliant Yellow 6 GF (Color Index-Solvent Yellow 44); and/or the fluorescent cuomarin dyes, for example, Calcofluor White RW (Color Index-Fluorescent brightening agent 68) and Blancophor White AW (Color Index-Fluorescent brightening agent 68). Other fluorescent dyes can include Rhodanine B, Rhodanine 6 GDN, Auramine, Eosine G, Calcofluor White ST, Pontamine White RT, Pontamine White BTS, Rhodamine Bx, Phthalocyamine, Alkali Blue G, Phthalocyamine, Rhoamine 7G, Rhodamine FB, Rhodamine S, Rhodamine 5G, Bright Yellow 3G, Teteramethyl Rhodamine, Rhodamine FG, Rhodamine F4G, Fanal Pink D, Fanal Violet D, Flexo Yellow 110, Lumogen Yellow D, Fluorol Green Gold, Fluorol Yellow, Thermoplast F-Orange, or combinations thereof.

In one example, the fluorescent colorant can be present in the fluorescing detailing agent in an amount ranging from about 0.01 wt % to about 30 wt % based on a total wt % of the fluorescing detailing agent. In one example, the fluorescent colorant can be present in the fluorescing detailing agent at from about 1 wt % to about 20 wt %. In yet other examples, the fluorescent colorant can be present in the fluorescing detailing agent at from about from about 0.1 wt % to about 10 wt %, from about 2 wt % to about 8 wt %, or from about 1 wt % to about 5 wt % based on the total weight of the fluorescing detailing agent. In yet other examples, the fluorescent colorant can be present in the fluorescing detailing agent in an amount of less than about 10 wt %, less than about 9 wt %, less than about 8 wt %, less than about 7 wt %, less than about 6 wt %, less than about 5 wt %, or less than about 4 wt %, based on the total weight of the fluorescing detailing agent.

In one example, the fluorescing detailing agent can include from about 70 wt % to about 99 wt % water, from about 1 wt % to about 10 wt % organic co-solvent, from about 0.1 wt % to about 1 wt % surfactant, from about 0.01 wt % to about 1 wt % anti-kogation agent, and from about 0.1 wt % to about 30 wt % fluorescent colorant, based on a total weight of the fluorescing detailing agent.

Liquid Vehicle

As used herein, the term "liquid vehicle" may refer to the liquid fluid in the fusing agent, the fluorescing detailing agent, or a combination thereof. The liquid vehicle may include water alone or in combination with a variety of additional components. Examples of these additional components may include co-solvent, surfactant, antimicrobial agent, anti-kogation agent, and/or a chelating agent.

The liquid vehicle can include water to balance. In some examples, the water can be deionized. In one example, water can be present in the fusing agent, the fluorescing detailing agent, or a combination thereof at a weight percentage that can vary from about 50 wt % to about 90 wt %. In some examples, water can be present in the fusing agent, the fluorescing detailing agent, or a combination thereof in amounts greater than about 50 wt %. In other examples, the fusing agent, the fluorescing detailing agent, or a combination thereof can include water in an amount of from about 60 wt % to about 90 wt %, or from about 70 wt % to about 85 wt % with respect to the total wt % of the fusing agent or the total wt % of the fluorescing detailing agent.

The liquid vehicle may include co-solvent(s). Some examples of co-solvent that may be added to the vehicle include 1-(2-hydroxyethyl)-2-pyrollidinone, 2-pyrrolidinone, 2-methyl-1,3-propanediol, 1,5-pentanediol, triethylene glycol, tetraethylene glycol, 1,6-hexanediol, tripropylene glycol methyl ether, ethoxylated glycerol-1 (LEG-1), and combinations thereof. In one example, the co-solvent can include a mixture of 2-pyrrolidonone and triethylene glycol. Whether a single co-solvent is used or a combination of co-solvents is used, the total amount of co-solvent(s) in the liquid vehicle can range from about 2 wt % to about 80 wt % based on wt % of the fusing agent or the total wt % of the fluorescing detailing agent.

The liquid vehicle may also include surfactants. The surfactants can include non-ionic surfactants. Example nonionic surfactants can include a self-emulsifiable, nonionic wetting agent based on acetylenic diol chemistry (e.g., SURFYNOL® SEF from Air Products and Chemicals, Inc. (USA)), a nonionic fluorosurfactant (e.g., CAPSTONE® fluorosurfactants from DuPont (USA)), and combinations thereof. In other examples, the surfactant can be an ethoxylated low-foam wetting agent (e.g., SURFYNOL® 440, SURFYNOL® 465, or SURFYNOL® CT-111 from Air Products and Chemical Inc. (USA)) or an ethoxylated wetting agent and molecular defoamer (e.g., SURFYNOL® 420 from Air Products and Chemical Inc. (USA)). Still other surfactants can include non-ionic wetting agents and molecular defoamers (e.g., SURFYNOL® 104E from Air Products and Chemical Inc. (USA)), non-ionic, alkylphenylethoxylate, and solvent free surfactant blends (e.g., SURFYNOL® CT-211 from Air Products and Chemicals, Inc. (USA)), water-soluble, non-ionic surfactants (e.g., TERGITOL® TMN-6, TERGITOL® 15S7, and TERGITOL® 15S9 from The Dow Chemical Company (USA)), and combinations thereof. In another example, the surfactant can include a non-ionic organic surfactant (e.g., TEGO® Wet 510 from Evonik Industries AG (Germany)), a non-ionic a secondary alcohol ethoxylate (e.g., TERGITOL® 15-S-5, TERGITOL® 15-S-7, TERGITOL® 15-S-9, and TERGITOL® 15-S-30 all from Dow Chemical Company (USA)), and combinations thereof.

In some examples, a non-ionic surfactant can be used in combination with an anionic or a cationic surfactant. An example anionic surfactant can include alkyldiphenyloxide disulfonate (e.g., DOWFAX® 8390 and DOWFAX® 2A1 from The Dow Chemical Company (USA)). An example of cationic surfactants can include dodecyltrimethylammonium chloride and hexadecyldimethylammonium chloride. In some examples, a surfactant having a hydrophilic-lipophilic balance (HLB) less than 10 may be incorporated into the liquid vehicle to assist in the spreadability of a colorant.

A surfactant may be present in the liquid vehicle in an amount ranging from about 0.1 wt % to about 4 wt % with respect to the total wt % of the fusing agent or the total wt % of the fluorescing detailing agent.

In some examples, the liquid vehicle may also include additives. The additives may be an anti-kogation agent, a chelating agent, an antimicrobial agent, or a combination thereof. While the amount of the additives may vary depending upon the type of additive, additives can be present in an amount ranging from about 0.001 wt % to about 20 wt % with respect to the total wt % of the fusing agent or the total wt % of the fluorescing detailing agent.

An anti-kogation agent may be included in the liquid vehicle. Kogation refers to the deposit of dried components on a heating element of a thermal inkjet print head. Anti-kogation agent(s) can be included to prevent the buildup of dried components and prevent kogation. Examples of anti-kogation agents can include oleth-3-phosphate or polyoxyethyene (3) oleyl mono/di-phosphate (e.g., commercially available as CRODAFOS® O3A or CRODAFOS® N-3 acid from Croda (USA)), aqueous dispersions of fumed alumina or fumed silica (e.g., CAB-O-SPERSE® from Cabot Corp. (USA)), metal chelator/chelating agents, such as methylglycinediacetic acid (e.g., TRILON® M from BASF Corp. (Germany)),or a combination of oleth-3-phosphate and a low molecular weight (e.g., <5,000) polyacrylic acid polymer. The total amount of anti-kogation agent(s) in in the liquid vehicle can range from about 0.1 wt % to about 0.2 wt % with respect to the total wt % of the fusing agent or the total wt % of the fluorescing detailing agent.

The liquid vehicle may also include a chelating agent. Chelating agent(s) can be used to minimize or to eliminate the deleterious effects of heavy metal impurities. Examples of suitable chelating agents can include disodium ethylenediaminetetraacetic acid (EDTA-Na), ethylene diamine tetra acetic acid (EDTA), and methyl-glycinediacetic acid (e.g., TRILON® M from BASF Corp. (Germany)). Whether a single chelating agent is used or a combination of chelating agents is used, the total amount of chelating agent(s) in the liquid vehicle may range from 0 wt % to about 2 wt % with respect to the total wt % of the fusing agent or the total wt % of the fluorescing detailing agent.

The liquid vehicle may also include antimicrobial agents. Antimicrobial agents can include biocides and fungicides. Example antimicrobial agents can include the NUOSEPT® (Ashland Inc. (USA)), VANCIDE® (R.T. Vanderbilt Co. (USA)), ACTICIDE® B20 and ACTICIDE® M20 (Thor Chemicals (U.K.)), PROXEL® GXL (Arch Chemicals, Inc. (USA)), BARDAC® 2250, 2280, BARQUAT® 50-65B, and CARBOQUAT® 250-T, (Lonza Ltd. Corp. (Switzerland)), KORDEK® MLX (The Dow Chemical Co. (USA)), and combinations thereof. In an example, the a total amount of antimicrobial agents in the liquid vehicle can range from about 0.1 wt % to about 1 wt % with respect to the total wt % of the fusing agent or the total wt % of the fluorescing detailing agent.

In some examples, liquid vehicle may further include buffer solution(s). In some examples, the buffer solution(s) can withstand small changes (e.g., less than 1) in pH when small quantities of a water-soluble acid or a water-soluble base are added to a composition containing the buffer solution(s). The buffer solution(s) can have pH ranges from about 5 to about 9.5, or from about 7 to about 9, or from about 7.5 to about 8.5.

In some examples, the buffer solution(s) can include a poly-hydroxy functional amine. In other examples, the buffer solution(s) can include potassium hydroxide, 2-[4-(2-hydroxyethyl) piperazin-1-yl] ethane sulfonic acid, 2-amino-2-(hydroxymethyl)-1,3-propanediol (TRIZMA® sold by Sigma-Aldrich (USA)), 3-morpholinopropanesulfonic acid, triethanolamine, 2-[bis-(2-hydroxyethyl)-amino]-2-hydroxymethyl propane-1,3-diol (bis tris methane), N-methyl-D-glucamine, N,N,N'N'-tetrakis-(2-hydroxyethyl)-ethylenediamine and N,N,N'N'-tetrakis-(2-hydroxypropyl)-ethylenediamine, beta-alanine, betaine, or mixtures thereof. In yet other examples, the buffer solution(s) can include 2-amino-2-(hydroxymethyl)-1,3-propanediol (TRIZMA® sold by Sigma-Aldrich (USA)), beta-alanine, betaine, or mixtures thereof.

The buffer solution(s) can be added in amounts ranging from about 0.01 wt % to about 20 wt %, from about 0.1 wt % to about 15 wt %, from about 0.1 wt % to about 10 wt % based on the total weight with respect to the total wt % of the fusing agent or the total wt % of the fluorescing detailing agent.

Polymeric Powder Build Material

In some examples, the polymeric powder build material can be selected from polymeric powder, polymeric-ceramic composite powder, or a combination thereof. As used herein, the term "polymeric powder build material" can refer to crystalline or semi-crystalline polymer particles or composite particles made up of polymer and ceramic materials. These particles can be in powder form. In one example, the polymeric powder build material can include from about 80 wt % to 100 wt % polymeric powder, from about 80 wt % to 100 wt % polymer-ceramic powder, or from about 80 wt % to 100 wt % of a combination thereof.

The polymeric powder build material may include similarly sized particles or differently sized particles. The term "size" or "particle size," as used herein, refers to the diameter of a substantially spherical particle, or the effective diameter of a non-spherical particle, e.g., the diameter of a sphere with the same mass and density as the non-spherical particle as determined by weight. A substantially spherical particle, e.g., spherical or near-spherical, can have a sphericity of >0.84. Thus, any individual particles having a sphericity of <0.84 can be considered non-spherical (irregularly shaped).

In some examples, a particle size of particles in the polymeric powder build material can range from about 10 µm to about 500 µm. In yet other examples, a particle size of particles in the polymeric powder build material can be less than about 450 µm, less than about 400 µm, less than about 350 µm, less than about 300 µm, less than about 250 µm, less than about 200 µm, less than about 150 µm, less than about 150 µm, less than about 90 µm, or less than about 80 µm. In further examples, a particle size of particles in the polymeric powder build material can range from about 10 µm to about 190 µm, from about 20 µm to about 180 µm, from about 50 µm to about 150 µm, from about 40 µm to about 130 µm, or from about 100 µm to about 400 µm.

In one example the polymeric build material can include a polymer that can be a plastic or thermoplastic material. Example plastic or thermoplastic materials can include polyethylene, polypropylene, polyoxomethylene (e.g., polyacetals), polystyrene, polycarbonate, polyester, polyurethanes, and combinations thereof.

In some examples, the polymeric build material can include a semi-crystalline or crystalline thermoplastic material. Semi-crystalline or crystalline thermoplastic materials can include thermoplastics with a processing window of from about 5° C. to about 30° C., e.g., the temperature range between the melting point and the re-crystallization temperature of the thermoplastic. An example of semi-crystalline thermoplastic materials can include polyamides (PAs), e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.

In some examples, the polymeric build material can include a polymeric-ceramic composite powder. The "polymeric-ceramic composite" powder can include the polymers, described above, in combination with ceramic materials, described below, in the form of a composite. Combinations of the polymers described herein can include blends, mixtures, block copolymers, random copolymers, alternating copolymers, periodic polymers, and mixtures thereof.

The polymeric-ceramic composite can include any weight combination of polymeric material and ceramic material. For example, the polymeric material can be present in an amount ranging from about 0.01 wt % up to about 99.99 wt % with the balance being ceramic material or the ceramic material can be present in an amount in an amount ranging from about 0.01 wt % up to about 99.99 wt % with the balance being polymeric material. In one example, a polymeric-ceramic composite can include about 30 wt % glass and about 70 wt % alumina.

In some examples, the ceramic material can be selected from silica, fused silica, quartz, alumina silicates, magnesia silicates, boria silicates, or a mixture thereof. Examples of ceramic materials can include metal oxide, inorganic glass, carbide, nitride, or boride. Other examples can include alumina ($Al_2O_3$), $Na_2O/CaO/SiO_2$ glass (soda-lime glass), silicon nitride ($Si_3N_4$), silicon dioxide ($SiO_2$), zirconia ($ZrO_2$), titanium dioxide ($TiO_2$), glass frit materials, or combinations thereof.

In some examples, the polymeric build material can include fillers. The fillers can be selected from glass beads, glass fibers, fumed silica, natural fibers, synthetic fibers, carbon fibers, boron fibers, KEVLAR® fiber (DuPont (USA)), PTFE fiber, ceramic fibers, silicon carbide fibers, alumina fiber, and combinations thereof. In some examples, the filler can include inorganic oxides, carbides, borides, or a combination thereof. In yet another example, the filler can include inorganic oxides, nitrides, borides and carbides of zirconium, tantalum, titanium, tungsten, boron, aluminum, and/or beryllium. In yet other examples, the filler can be silicon carbide and aluminum oxide.

A filler can be added to the polymeric build material in an amount of up to about 30 wt % based on the total amount of the polymeric build material. In yet other examples, a filler material can be added to the polymeric build material in an amount ranging from about 0.01 wt % to about 25 wt %, from about 0.01 wt % to about 20 wt %, from about 0.01 wt % to about 15 wt %, or from about 0.01 wt % to about 10 wt %.

The polymeric powder build material can have a melting point or softening point that can range from about 50° C. to about 400° C. The melting point or softening point can be dependent on a composition of the polymeric powder build material, a particle size of the particles in the polymeric powder build material, or a combination thereof. As an example, particles in the polymeric powder build material of a polyamide having a particle size ranging from about 1 µm to about 100 µm or from about 20 µm to about 50 µm can have a melting point of about 180° C.

Method of Three-Dimensional Printing

Figure 3:
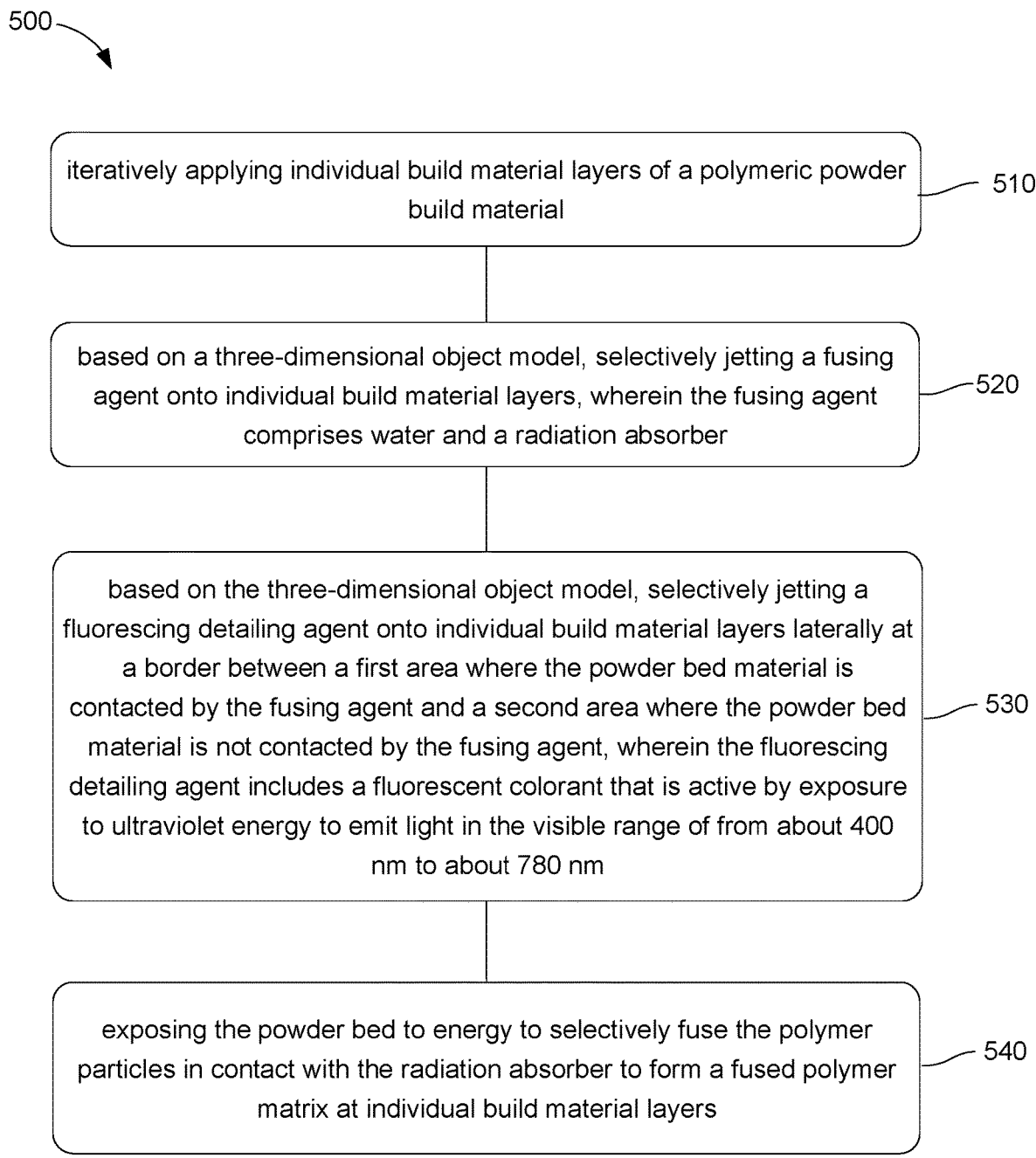
FIG. 3 is a graphically illustrates an example method of three-dimensional printing in accordance with examples of the present disclosure.

In still another example, as shown in FIG. 3, a method 500 of three-dimensional printing can include iteratively applying 510 iteratively applying individual build material layers of a polymeric powder build material. The method also includes, based on a 3D object model, selectively jetting 520 a fusing agent onto individual build material layers, and selectively jetting 530 a fluorescing detailing agent onto individual build material layers. The selective jetting of the fluorescing detailing agent can occur laterally at a border between a first area where the polymeric powder build material is contacted by the fusing agent and a second area where the polymeric powder build material is not contacted by the fusing agent. The method can further include exposing 540 the powder bed to energy to selectively fuse particles of the polymeric powder build material in contact with the radiation absorber to form a fused polymer matrix at individual build material layers.

The radiation absorber in the fusing agent can act convert the energy from the absorbed radiation to thermal energy and promote the transfer of thermal heat to the particles of the polymeric powder build material that the radiation absorber is in contact with. In an example, the fusing agent can elevate the temperature of the particles of the polymeric powder build material above the melting or softening point of the particles, thereby allowing fusing (e.g., sintering, binding, curing, etc.) of the polymeric build material particles and the formation of an individual layer of a 3D object. The method can be repeated until all the individual build material layers have been created and a 3D object is formed.

In some examples, following formation of a printed 3D object a fluorescence of the fluorescent colorant can be activated by a source of ultraviolet energy in the range of from about 200 nm to about 400 nm. The method can further include observing the fluorescence of the fluorescent colorant. In some examples, ultraviolet energy source can include a black light. The fluorescence can produce readable elevated text, readable engraved text, readable elevated barcodes, and readable engraved barcodes by forming contrast between the text/barcode and the object.

Figure 4:
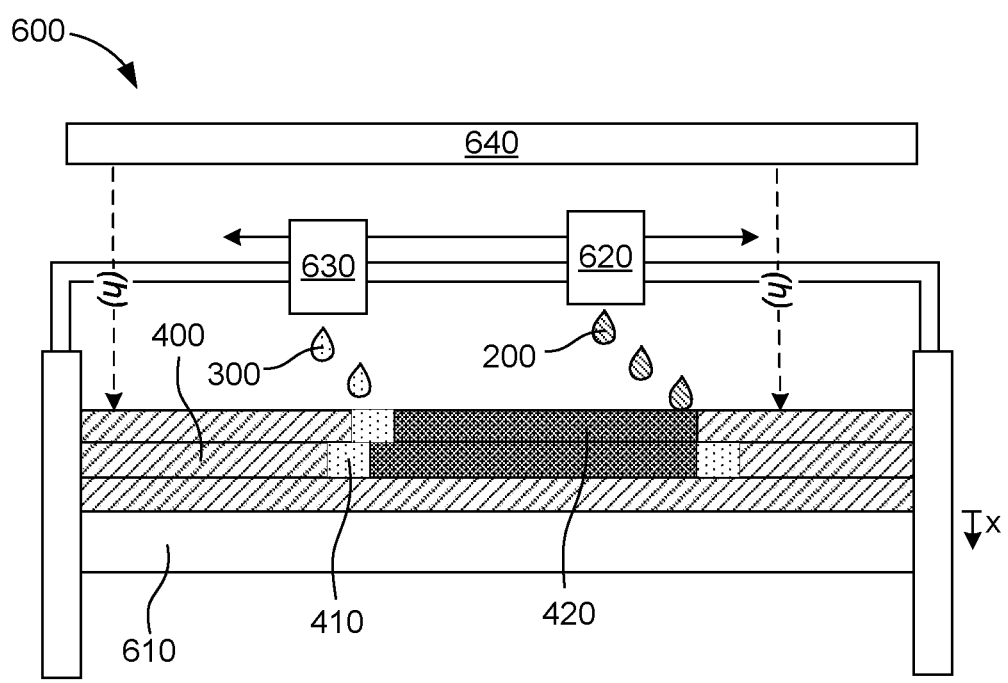
FIG. 4 is a flow diagram illustrating an example method of three-dimensional printing in accordance with examples of the present disclosure.

In one example, as illustrated in FIG. 4, the method of three-dimensional printing can be carried out using a three-dimensional printing system 600 or apparatus. The system can include a build platform 610, radiation source 640 positioned to emit energy toward the build platform and the powder bed material 400 positioned thereon, and print heads 620 and 630. In further detail, the build platform can hold the polymeric powder build material and to drop in height (shown at "x"), thus allowing for successive layers of polymeric powder build material to be applied. The particulate powder build material can be layered in the build platform at a thickness that can range from about 10 µm to about 1 cm. In some examples, individual layers can have a relatively uniform thickness. In one example, a thickness of a layer of the particulate powder build material can range from about 10 µm to about 500 µm. In another example, a thickness of a layer of the particulate powder build material can range from about 500 µm to about 1 cm.

The print heads can be configured to selectively apply a patterned layer of the fusing agent 200 and the fluorescing detailing agent. The selective application of the fusing agent can occur by ejecting the fusing agent from print head 620 onto the particulate powder build material to mix with the particulate powder bed material at location 420. The selective application of the fluorescing detailing agent can occur by ejecting the fluorescing detailing agent from a print head 630 onto the particulate powder build material to admix with the particulate powder bed material at location 410.

Following the selective application the patterned layer of the particulate powder bed material with the fusing agent applied thereto can be exposed to electromagnetic radiation from the radiation source. The radiation source can be an infrared (IR) or near-infrared light source, such as IR or near-IR curing lamps, IR or near-IR light emitting diodes (LED), or lasers with the desirable IR or near-IR electromagnetic wavelengths, and can emit electromagnetic radiation having a wavelength ranging from about 400 nm to about 1 mm. In one example, the emitted electromagnetic radiation can have a wavelength that can range from about 400 nm to about 2 µm. In some examples, the radiation source can be operatively connected to a lamp/laser driver, an input/output temperature controller, and/or temperature sensors.

Upon fusion, a 3D object layer can be formed and the build platform can be dropped (x), followed by the spreading of an additional layer of the particulate powder build material thereon to continue the build. The respective layers can be patterned one layer at a time and exposed to energy until the 3D object is formed.

Definitions

As used in this specification and the appended claims, the singular forms "a," "an," and "the" include plural referents unless the content clearly dictates otherwise.

The term "about" as used herein, when referring to a numerical value or range, allows for a degree of variability in the value or range, for example, within 10 wt %, or, in one aspect within 5 wt %, of a stated value or of a stated limit of a range. The term "about" when modifying a numerical range is also understood to include as one numerical sub-range a range defined by the exact numerical value indicated, e.g., the range of about 1 wt % to about 5 wt % includes 1 wt % to 5 wt % as an explicitly supported sub-range.

"Absorption" means that 80% or more of radiation having wavelengths ranging from 800 nm to 4000 nm can be absorbed by a material.

As used herein, the terms "3D part," "3D object," or the like, refer to the target 3D article that is being built.

As used herein, the term "dispersion" refers to a two-phase system where one phase is a solid particulate distributed throughout a second phase of a liquid substance, e.g., liquid vehicle. For example, nanoparticles of a radiation absorber can be distributed in a liquid vehicle.

As used herein, a plurality of items, structural elements, compositional elements, and/or materials may be presented in a common list for convenience. However, these lists should be construed as though individual members of the list is individually identified as a separate and unique member. Thus, no individual member of such list should be construed as a de facto equivalent of any other member of the same list solely based on a presentation in a common group without indications to the contrary.

Concentrations, amounts, and other numerical data may be expressed or presented herein in range formats. Such range formats are used merely for convenience and brevity and thus should be interpreted flexibly to include not just the numerical values explicitly recited as the end points of the range, but also to include all the individual numerical values or sub-ranges encompassed within that range as if individual numerical values and sub-ranges are explicitly recited. As an illustration, a numerical range of "about 1 wt % to about 5 wt %" should be interpreted to include not just the explicitly recited values of about 1 wt % to about 5 wt %, but also include individual values and subranges within the indicated range. Thus, included in this numerical range are individual values such as 2, 3.5, and 4 and sub-ranges such as from 1-3, from 2-4, and from 3-5, etc. This same applies to ranges reciting a single numerical value.

Reference throughout the specification to "an example," "some examples," "another example," "other example," and so forth, means that a particular element (e.g., feature, structure, and/or characteristic) described in connection with the example is included in one example described herein, and may or may not be present in other examples. In addition, the described elements for any example may be combined in any suitable manner in the various examples unless the context clearly dictates otherwise.

EXAMPLES

The following illustrates an example of the present disclosure. However, the following is illustrative of the application of the principles of the present disclosure and is not limiting. Numerous modifications and alternative compositions, methods, and systems may be devised without departing from the spirit and scope of the present disclosure. The appended claims are intended to cover such modifications and arrangements.

Example 1—Preparation of a Fluorescing Detailing Agent

A fluorescing detailing agent for a multi-fluid kit for three-dimensional printing was prepared by admixing the components together in accordance with the formulation in Table 1, below.

TABLE 1

| Fluorescing Detailing Agent | | |
|---|---|---|
| Component | Component Type | Wt % |
| TINOPAL ® SFP | Fluorescent Colorant | 3 |
| 2-pyrrolidine | Co-solvent | 4 |

TABLE 1-continued

| Fluorescing Detailing Agent | | |
|---|---|---|
| Component | Component Type | Wt % |
| Triethylene glycol | Co-solvent | 11 |
| TERGITOL ® 15-S-9 | Surfactant | 0.85 |
| Tris(hydroxymethane) aminomethane | Buffer | 0.10 |
| CRODAFOS ® O3A | Anti-kogation Agent | 0.5 |
| TRILON ® M | Chelating Agent | 0.05 |
| ACTICIDE ® B20 | Biocide | 0.18 |
| ACTICIDE ® M20 | Biocide | 0.07 |
| Deionized Water | Solvent | balance |
| Total | | 100 |

TINOPAL ® SFP and TRILON ® M are available from BASF Corp. (Germany).
TERGITOL ® 15-S-9 is available from The Dow Chemical Company (USA).
CRODAFOS ® O3A is available from Croda Int. (USA).
ACTICIDE ® B20 and ACTICIDE ® M20 are available from Thor Group Ltd. (U.K.).

TABLE 2

| Example Fusing Agent* | | |
|---|---|---|
| Component | Component Type | Wt % |
| Cab-o-jet ® 400 | Carbon black | 4.00 |
| Diethylene glycol | Co-solvent | 10.00 |
| 2-pyrrolidine | Co-solvent | 15.00 |
| TERGITOL ® 15-S-9 | Surfactant | 1.00 |
| ethylene diamine tetra acetic acid (EDTA) | Chelating Agent | 0.01 |
| Proxel ® GXL | Biocide | 0.20 |
| Deionized Water | Solvent | 69.79 |
| Total | | 100.00 |

CAB-O-JET ® 400 is available from Cabot Corporation (USA)
TERGITOL ® 15-S-9 is available from The Dow Chemical Company (USA)
PROXEL ® GXL (Arch Chemicals, Inc.(USA)
*A similar fusing agent was used for generating data hereinafter, but it was verified that the formulation of Table 2 generated approximately the same relative data with respect to fusion and detailing properties.

Example 2—Printing 3D Objects

A 80 μm single layer of PA12 particles having a D50 particle size of 60 μm was dispersed evenly on a build platform of three-dimensional printing system. A fusing agent similar to the fusing agent formulation in Table 2 was selectively printed from a thermal inkjet print head onto a layer of the PA12 particles. The fluorescing detailing agent was ejected from thermal inkjet print head onto the single layer of PA12 particles in the space lateral to a border between a where the particles were contacted by the fusing agent and an area where the particles were not contacted by the fusing agent. A black body radiation source at a temperature of 2750K was directed to layer of PA12 particles for 250 ms/voxel to form a fused 3D object layer. The layering was repeated until a 3D object was formed.

Example 3—Visual Evaluation of Fluorescence of Fluorescing Detailing Agent on an Engraved Part The process in Example 2 was used to print a 3D object (Object 1) in the form of a rectangular cube with capital letter text recessed 0.5 mm deep therein. The process in Example 2 was also used to print two control 3D objects (Control Object 1 and Control Object 2) in the form of in the form of a rectangular cube with capital letter text also recessed 0.5 mm deep thereon. The control objects were not printed with the fluorescing detailing agent. Instead, the control object was printed with a detailing agent that excluded the fluorescent colorant. Thus, the control object was printed with a detailing agent had the same formulation as provided in the formulation of Table 1, except the fluorescent colorant was removed and replaced with water.

When visually inspected in standard lighting, the recessed text was visible on all the 3D printed objects. The engraved text appeared clearer on Object 1 than the recessed text appeared on Control Object 1. When visually inspected under black lighting, the recessed text was highly visible in Object 1. The text was not particularly visible on Control Object 1.

Example 4—Evaluation of Fluorescing Detailing Agent on Print Precision

The process in Example 2 was used to print two 3D objects (Object 2 and Object 3) in the form of 56 mm×28 mm×8 mm monolithic plates with holes (or "holey plates") of different target sizes, e.g., three-1 mm holes, three-1.5 mm holes, three-2 mm holes, and three-2.5 mm holes. The process in Example 2 was also used to print two control 3D objects (Control Object 2 and Control Object 3) in the form of holey plate of the same size and with the same target holes sizes. The control objects were not printed with the fluorescing detailing agent. Instead the detailing agent that was used excluded the fluorescent colorant, which was replaced by water.

The holes through Objects 2 and 3 and Control Objects 2 and 3 were measured to determine actual hole size in relation to the target hole size. The measured values are shown in Tables 3-6 below.

TABLE 3

Actual size of Holes Formed in Target 2.5 mm Holes

| Printed Object ID | Hole ID | Hole Size (mm) | Average Hole Size (mm) |
|---|---|---|---|
| Object 2 | Hole A | 2.193 | 2.211 |
| | Hole B | 2.205 | |
| | Hole C | 2.236 | |
| Object 3 | Hole A | 2.399 | 2.452 |
| | Hole B | 2.519 | |
| | Hole C | 2.437 | |
| Control Object 2 | Hole A | 2.477 | 2.490 |
| | Hole B | 2.528 | |
| | Hole C | 2.466 | |
| Control Object 3 | Hole A | 2.326 | 2.331 |
| | Hole B | 2.334 | |
| | Hole C | 2.333 | |

TABLE 4

Actual size of Holes Formed in Target 2 mm Holes

| Printed Object ID | Hole ID | Hole Size (mm) | Average Hole Size (mm) |
|---|---|---|---|
| Object 2 | Hole A | 2.031 | 2.040 |
| | Hole B | 2.042 | |
| | Hole C | 2.049 | |
| Object 3 | Hole A | 2.084 | 2.106 |
| | Hole B | 2.117 | |
| | Hole C | 2.118 | |
| Control Object 2 | Hole A | 2.074 | 2.091 |
| | Hole B | 2.102 | |
| | Hole C | 2.096 | |
| Control Object 3 | Hole A | 2.05 | 2.055 |
| | Hole B | 2.068 | |

TABLE 4-continued

Actual size of Holes Formed in Target 2 mm Holes

| Printed Object ID | Hole ID | Hole Size (mm) | Average Hole Size (mm) |
|---|---|---|---|
| | Hole C | 2.048 | |

TABLE 5

Actual size of Holes Formed in Target 1.5 mm Holes

| Printed Object ID | Hole ID | Hole Size (mm) | Average Hole Size (mm) |
|---|---|---|---|
| Object 2 | Hole A | 1.483 | 1.495 |
| | Hole B | 1.506 | |
| | Hole C | 1.496 | |
| Object 3 | Hole A | 1.527 | 1.552 |
| | Hole B | 1.558 | |
| | Hole C | 1.572 | |
| Control Object 2 | Hole A | 1.513 | 1.537 |
| | Hole B | 1.544 | |
| | Hole C | 1.555 | |
| Control Object 3 | Hole A | 1.52 | 1.509 |
| | Hole B | 1.528 | |
| | Hole C | 1.479 | |

TABLE 6

Actual size of Holes Formed in Target 1 mm Holes

| Printed Object ID | Hole ID | Hole Size (mm) | Average Hole Size (mm) |
|---|---|---|---|
| Object 2 | Hole A | — | — |
| | Hole B | — | |
| | Hole C | — | |
| Object 3 | Hole A | — | 0.864 |
| | Hole B | — | |
| | Hole C | 0.864 | |
| Control Object 2 | Hole A | 0.784 | 0.891 |
| | Hole B | 0.923 | |
| | Hole C | 0.967 | |
| Control Object 3 | Hole A | 0.844 | 0.837 |
| | Hole B | 0.839 | |
| | Hole C | 0.829 | |

The use of the fluorescing detailing agent provided slightly smaller actual hole sizes than the actual hole sizes formed by the detailing agent excluding the fluorescent colorant. Despite the slightly smaller actual holes sizes the actual hole sizes where comparable with an acceptable to negligible reduction in detailing of the printed object. Thus, the performance with the fluorescing colorant did not appreciably detract from the detailing function of the detailing agent, but provided the added benefit of enhanced visibility in the visible spectrum when irradiated with UV light, e.g., black light.

Example 5—Visual Evaluation of Fluorescence of Fluorescing Detailing Agent Object The process in Example 2 was used to print four 3D objects in the form of a square cube with a 2.5 cm×2.5 cm barcode engraved (or recessed) thereon. The barcode was recessed at a different depth on the various the 3D objects. The barcodes were recessed at depths of 0.2 mm 0.3 mm, 0.4 mm, and 0.5 mm. When visually inspected in standard lighting, the recessed barcode was visible on all the 3D printed objects. When visually inspected under UV light, e.g., black light, the recessed barcode appeared clearer, with clarity enhancement at deeper depths. In other words, the readability/clarity of the barcodes increased with depth possibly because of a parallax effect. e.g., the 0.3 mm deep barcode was clearer than the 0.2 mm deep barcode, the 0.5 mm deep barcode was clearer than the 0.4 mm deep barcode.

What is claimed is:

1. A multi-fluid kit for three-dimensional printing, comprising:
   a fusing agent comprising water and a radiation absorber, wherein the radiation absorber absorbs radiation energy and converts the radiation energy to heat; and
   an inkjettable fluorescing detailing agent comprising water and a fluorescent colorant that is activated by exposure to ultraviolet energy to emit light in the visible range of from about 400 nm to about 780 nm, wherein the fluorescent colorant is hexasodium-2,2'-[vinylenebis [3-sulfonato-4,1-phenylene)imino[6-(diethylamino)-1,3,5-triazine-4,2-diyl]imino]]bis(benzene-1,4-disulphonate), and wherein the multi-fluid kit is devoid of a second detailing agent and a second fluorescent colorant.

2. The multi-fluid kit of claim 1, wherein the fluorescent colorant is present in the fluorescing detailing agent in an amount of from about 0.01 wt % to about 10 wt %.

3. The multi-fluid kit of claim 1, wherein the fluorescent colorant is colorless unless exposed to the ultraviolet energy.

4. The multi-fluid kit of claim 1, wherein the fluorescent colorant is activated by ultraviolet energy in the range of from about 200 nm to about 400 nm.

5. The multi-fluid kit of claim 1, wherein the radiation absorber includes an infrared light absorbing nanoparticle or a near infrared light absorbing nanoparticle having an average size from about 0.01 nm to about 500 nm.

6. The multi-fluid kit of claim 1, wherein the radiation absorber includes an infrared light absorbing compound or a near infrared light absorbing compound selected from the group consisting of carbon black, metal dithiolene complex, metal nanoparticles, oxonol, squarylium, chalcogenopyrylarylidene, bis(chalcogenopyrylo)polymethine, bis(aminoaryl)polymethine, merocyanine, trinuclear cyanine, indenecrosslinked polymethine, oxyindolidine, iron complexes, quinoids, nickel-dithiolene complex, cyanine dyes, conjugated polymer, and combinations thereof.

7. The multi-fluid kit of claim 1, wherein the fusing agent includes from about 60 wt % to about 94 wt % of the water, from about 5 wt % to about 35 wt % of an organic co-solvent, and from about 1 wt % to about 20 wt % of the radiation absorber, each based on a total weight of the fusing agent.

8. The multi-fluid kit of claim 7, wherein the organic co-solvent is selected from the group consisting of 1-(2-hydroxyethyl)-2-pyrrolidinone, 2-pyrrolidinone, 2-methyl-1,3-propanediol, 1,5-pentanediol, triethylene glycol, tetraethylene glycol, 1,6-hexanediol, tripropylene glycol methyl ether, ethoxylated glycerol-1 (LEG-1), and a combination thereof.

9. A three-dimensional printing kit, comprising:
   a polymeric powder build material; and
   a multi-fluid kit including:
   a fusing agent comprising water and a radiation absorber, wherein the radiation absorber absorbs radiation energy and converts the radiation energy to heat; and
   an inkjettable fluorescing detailing agent comprising water and a fluorescent colorant that is activated by exposure to ultraviolet energy to emit light in the visible range of from about 400 nm to about 780 nm, wherein the fluorescent colorant is hexasodium-2,2'-[vinylenebis [3-sulfonato-4,1-phenylene)imino[6-(diethylamino)-1,3,5-triazine-4,2-diyl]imino]]bis(benzene-1,4-disulphonate), and wherein the multi-fluid kit is devoid of a second detailing agent and a second fluorescent colorant.

10. The three-dimensional printing kit of claim 9, wherein the polymeric powder build material comprises from about 80 wt % to 100 wt % of a polymeric powder, from about 80 wt % to 100 wt % of a polymer-ceramic powder, or from about 80 wt % to 100 wt % of a combination of the polymeric powder and polymer-ceramic powder.

11. The three-dimensional printing kit of claim 9, wherein the radiation absorber is selected from the group consisting of an infrared light absorbing compound, a near infrared light absorbing compound, infrared light absorbing nanoparticles, near infrared light absorbing nanoparticles, and a combination thereof.

12. A method for three-dimensional printing, comprising:
   iteratively applying individual build material layers of a polymeric powder build material;
   based on a three-dimensional object model, selectively jetting a fusing agent onto individual build material layers, wherein the fusing agent comprises water and a radiation absorber;
   based on the three-dimensional object model, selectively inkjetting a fluorescing detailing agent onto individual build material layers laterally at a border between a first area where the powder bed material is contacted by the fusing agent and a second area where the powder bed material is not contacted by the fusing agent, wherein the fluorescing detailing agent includes a fluorescent colorant that is activated by exposure to ultraviolet energy to emit light in the visible range of from about 400 nm to about 780 nm, and wherein the fluorescent colorant is hexasodium-2,2'-[vinylenebis[3-sulfonato-4,1-phenylene)imino[6-(diethylamino)-1,3,5-triazine-4,2-diyl]imino]]bis(benzene-1,4-disulphonate); and
   exposing the powder bed to energy to selectively fuse the polymer particles in contact with the radiation absorber to form a fused polymer matrix at individual build material layers,
   wherein the method is devoid of using a second detailing agent and a second fluorescent colorant.

13. The method of claim 12, further comprising observing fluorescence of the fluorescent colorant activated by ultraviolet energy in the range of from about 200 nm to about 400 nm after the fused polymer matrix is formed.

* * * * *